Nov. 17, 1925.
A. AMSLER
RECORDING INSTRUMENT
Filed June 17, 1924
1,562,273
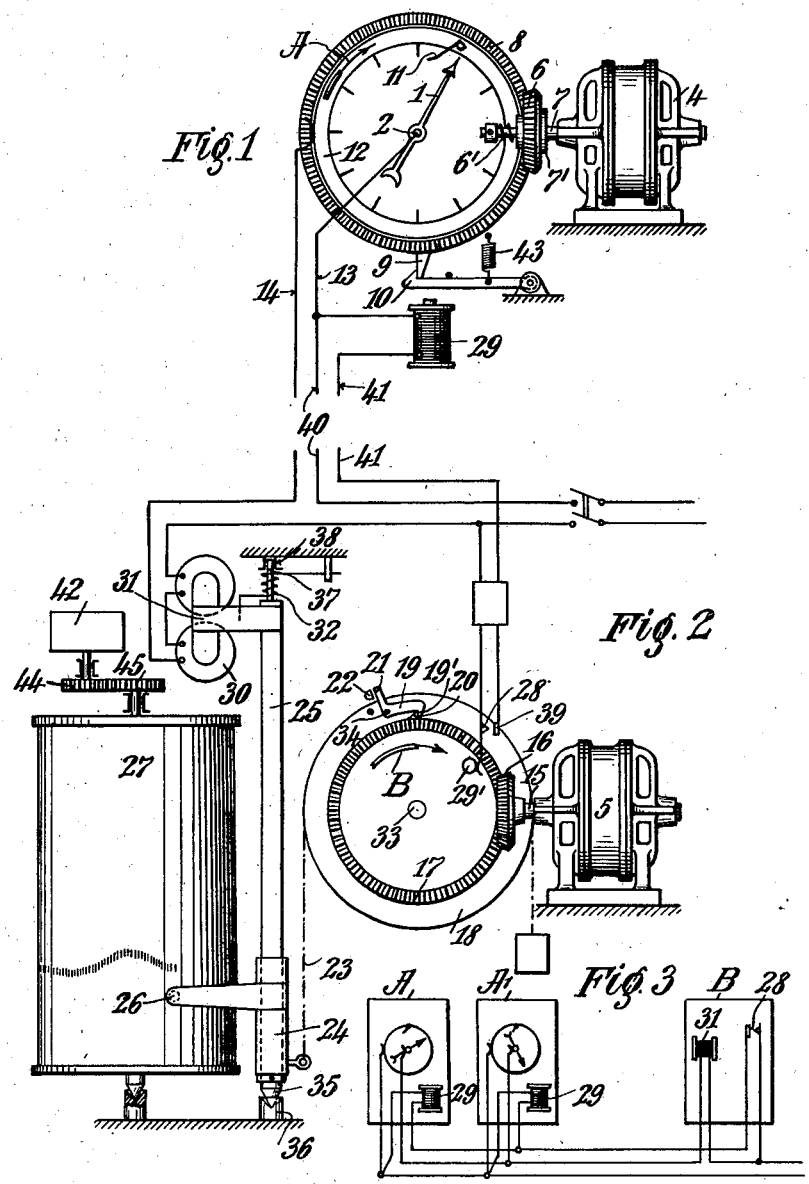
Inventor:
Alfred Amsler.
By Henry Orth Jr
Atty.

Patented Nov. 17, 1925.

1,562,273

UNITED STATES PATENT OFFICE.

ALFRED AMSLER, OF SCHAFFHAUSEN, SWITZERLAND.

RECORDING INSTRUMENT.

Application filed June 17, 1924. Serial No. 720,662.

*To all whom it may concern:*

Be it known that I, Dr. ALFRED AMSLER, a citizen of the Republic of Switzerland, residing at Schaffhausen, Switzerland, have invented certain new and useful Improvements in Recording Instruments, of which the following is a specification, reference being had therein to the accompanying drawing.

The present invention relates to recording instruments and has particularly reference to an apparatus for recording over a distance a variable position of an indicator; the apparatus may thus be used in every case in which the positions of a member indicating a water-level, the position of an electric switch, or of a control-lever on any regulating device or the like has to be recorded at a remote place and in the form of a continuous diagram.

With the apparatus according to the present invention a feeler mechanism provided on the primary instrument which shall be called hereinafter the sender and a recording stylus provided on the secondary instrument called the receiver are periodically and simultaneously moved by the action of synchronous working devices from their initial positions over at least part of the total indicating range of the sender and over the whole recording range of the receiver respectively whereby an electric circuit is influenced when the feeler passes the indicating means of the sender and contacts with said means and causes the recording stylus to be pressed against a recording surface and to produce a mark on that surface or sheet.

Preferably the feeler is rotated by the sender motor, through the intermediary of a friction gear, over one complete revolution during each play so that the initial position and the end position of the feeler coincide with each other, further an electromagnet is provided which holds the feeler in this position and releases it when an alteration of the electric current in the circuit of the electromagnet is effected whereupon a new play begins. The feeler is advantageously fixed to a disc intermittently rotated by the sender motor, the disc being provided with a projecting part which abuts at the end of one complete revolution against a stop provided on the armature of the electromagnet, and the alteration of the electric current in the circuit of the electro-magnet for synchronizing the start of the movements of feeler and recording stylus is effected by a contact device actuated by the receiver in the moment in which the stylus point moved by the receiver motor starts its movement over the recording range on the recording sheet.

When the recording stylus moves along its predetermined path it is pressed towards the recording sheet as long as the electric circuit is influenced by the contact of feeler and indicating means, for instance the indicator pointer, and a mark is produced on the recording sheet, the distance of the mark from the initial position of the stylus point corresponds to the position of the indicating means of the sender to a scale which depends on the velocity with which the feeler and the stylus point move. When the recording surface is slowly moved in the transverse direction, for instance by a clock-work, the total of the short-lines, produced by the stylus point, which may be a pen or a pencil, at short intervals, and which lines situated closely one beside the other, represent the diagram of the varying positions of the indicating means of the sender.

The motors actuating the sender and the receiver may be of any type provided they run synchronous, for instance two electric synchronous motors or two synchronized clock-works will serve the purpose.

The advantage of this recording over a distance of, for instance, the height of a water level, over known devices in the art consists in the fact that not the variations in the water level are transmitted and recorded but the absolute heights of the water. Thereby it is avoided that faults and interruptions in the transmission influence all the subsequent recordings. If a fault or an interruption occurs occasionally only a single record will be influenced thereby. In such a case there will be either no marking on the diagram of the receiver or a faulty marking which is off the continuous line of the diagram represented by the totality of the marks and appears as an isolated mark, the incorrectness of which is evident. When the electric current is interrupted from any cause the marking is interrupted but it is started again as soon as the current is again intact. The clock-work which preferably rotates the recording disc continues to work when the current fails and the duration of the interruption of the current may be ascertained later on from the diagram.

Embodiments of the invention are illustrated by way of example on the accompanying drawings, in which:

Fig. 1 shows the sender in elevation view and

Fig. 2 shows the receiver, by which the position of a pointer of the sender is recorded on a recording drum.

Figs. 3 and 4 show in a diagrammatic manner arrangements with more than one indicator and receiver respectively.

Referring now to Figs. 1 and 2, 1 denotes the indicator hand, which turns around the axle 2 over a dial 3. 4 and 5 are synchronous motor, for instance synchronous electric motors. The bevel wheel 6 is loosely mounted on the shaft 7 of the sender motor 4 and is pressed by means of helical spring 6' against a disc 7' of the shaft 7 so that the bevel wheel 6 is in frictional connection with the shaft 7. The bevel wheel 8 is loosely mounted on an axle coaxially arranged to the axle 2 and is rotated in the direction of the arrow A shown in Fig. 1 by the bevel wheel 6 meshing with the bevel wheel 8 until it is locked and a projecting part 9 on the bevel wheel 8 abuts against the hook 10, as is shown in Fig. 1, whereupon the bevel wheel 6 remains stationary and the shaft 7 continues to rotate owing to the frictional connection between shaft 7 and bevel wheel 6. 11 designates a contact spring fixed to a disc 12 which rotates together with the bevel wheel 8 but is electrically insulated from the latter. The spring 11 closes the electric circuit when it gets into contact with the hand 1, electric current being supplied by the conductors 13 and 14 to the insulated hand and to the insulated disc 12. The bevel wheel 8 together with the contact spring 11 acts as the feeler mechanism; the bevel wheel turns always in the same direction and is locked or kept stationary every time it has turned through one complete revolution; the initial position and the end position of the feeler mechanism coincide thus with each other.

15 (Fig. 2) designates the shaft of the receiver-motor to which the bevel wheel 16 is fixed. The latter is in mesh with the bevel wheel 17 and causes a continuous comparative slow rotation of the wheel 17 in the clock-wise direction about the axle 33. A disc 18 is loosely mounted on the axle 33 and carries a bell-crank lever 19, one arm of which is provided with a hook 19' cooperating with a tooth 20 fixed to the bevel wheel 17; thereby the disc 18 is caused to follow the rotation of the bevel wheel 17 until the disc 18 has performed approximately a complete revolution, whereupon the arm 21 of the bell crank lever 19 knocks against the stationary pin 22. The bell crank lever 19 is thereby turned about its fulcrum 34 and the hook 19 releases the tooth 20. A pulling organ 23, for instance a cord is slung around the circumference of the disc 18 and to one end of the cord the member 24 carrying the stylus point 26 is suspended. The member 24 is adapted to slide along the vertical rod 25 of square cross-section and is raised along said rod when the disc 18 turns in the direction of the arrow B. Thereby the stylus point 26 is moved over the whole indicating range up to the upper end of the recording drum 27 without touching the latter. The rod 25 is turnably mounted about its axis, to this end, the lower end of the rod 25 is shaped as a conical pivot 35 resting in a socket 36 and the upper end is provided with a pin 37 turnably mounted in the diagrammatically indicated journal bearing 38.

When the arm 21 knocks with its right hand side against the pin 22 the hook 19' releases the nose 20 and the member 24 moves by gravity action down into its initial position. The disc 18 is thereby turned at a high speed in the anticlockwise direction and the member 24 remains in its initial position until the hook 19' is again engaged by the nose 20 and the cycle starts again. The mechanism which synchronizes the start of the movement of feeler and stylus point consists of the following details. When the upward movement of the stylus point starts, a pin 29' on the bevel wheel 17 causes the contact spring 28 to bear against the contact block 39 whereby the electric circuit in the conductors 40, 41 leading to the electromagnet 29 is closed, the hook 10 is attracted by the electromagnet 29 and the projecting part 9 is released, so that the feeler, i. e. the bevel wheel 8, forming part thereof, starts to turn in the same moment in which the stylus point 26 starts its upward movement along the recording drum. As soon as the spring 11 gets into contact with the pointer 1 the electro-magnet 30 attracts its armature 31 which is rigidly connected to the turnable rod 25. Thereby the stylus point 26 is pressed against the recording drum 27 and marks a vertical line thereon during its upward movement, the length of the line depends on the duration of the contact between 1 and 11. When the contact between 1 and 11 is interupted and no current flows through the electromagnet 30, the rod 25 is turned into its inoperative position by the influence of the spring 32 whereby the stylus point 26 is lifted off the recording drum. The stylus point continues its movement in the upper direction up to the end of the total recording range and the feeler moves over the total indicating range until the feeler is locked by the hook 10 moved into the path of the part 9 by the action of the spring 43 when the contact device 28, 39 is again operative and the disengagement of nose 20 and hook 19' causes the stylus point 26 to return into its initial position indicated in Fig. 2, in which position it remains until a further operation of the contact device 28, 39. The recording drum 27 is continuously and slowly turned by means of a clockwork diagrammatically indicated at 42 turning the gear wheels 44, 45.

The totality of the small vertical lines produced by the stylus point 26 represents the diagram indicating the varying positions of the hand 1.

One or more additional senders may be interposed between the sender and the receiver shown in Figs. 1 and 2, and they act on the latter in the same manner as has been described above for a single sender. The stylus point, however, produces during every play as many marks on the recording drum as there are senders used. Such an arrangement is of practical importance when a continuous record of the corresponding levels of the head water race and the tail water race in a water power plant is desired or when it is desired to have the water levels of various points along the course of a river recorded on one recording sheet.

Further a plurality of receiver instruments may be actuated from one or more senders. In this case only one sender must be provided with a synchronizing device adapted to start all the sender and receiver instruments simultaneously. The other receiver instruments must be provided in the same manner as the sender instruments with a locking device which is released at every periodic action of the instruments by the synchronizing device of the receiver.

Fig. 3 shows diagrammatically an installation having two senders A and A¹ and one receiver B, whilst in Fig. 4 two senders A and A¹ and two receivers B and B¹ are shown. 28 denotes the synchronizing device of one of the receivers, 29 is the electromagnet for releasing the locking devices of the sender and receiver instruments and 31 indicates the electro-magnet serving to actuate the stylus point of the receiver instruments.

Instead of designing the sender so that the feeler performs one complete revolution during every play, whereby initial and end positions of the feeler coincide with each other, the sender may comprise a plurality of similar sectors each provided with a feeler contact spring, whereby the end position of the feeler of one sector is the initial position of the feeler of the next sector. The receiver instrument remains unchanged and its movements are performed during every displacement of a sender sector as will be readily understood.

I claim:

1. A device for recording over a distance the variable positions of an element, comprising in combination a sender adapted to ascertain the position of the element and having a contact mechanism co-operating with said element, a receiver instrument having a stylus point adapted to travel over a recording surface, means adapted to move the contact mechanism and the stylus point from their initial positions periodically and simultaneously, the contact mechanism being operated over the range including the various positions of said element and the stylus point moving over the whole recording range, electric connections between the sender and the receiver and means to cause the stylus point to produce a mark on the record surface when the contact mechanism engages the element.

2. A device for recording over a distance the variable positions of an element, comprising in combination a sender adapted to ascertain the position of the element and having a contact mechanism co-operating with said element, a receiver instrument having a stylus point adapted to travel over a recording surface, means adapted to move the contact mechanism and the stylus point from their initial positions periodically and simultaneously, the contact mechanism being operative over the range of said element and the stylus point moving over the whole recording range, electric connections between the sender and the receiver, means to cause the stylus point to produce a mark on the record surface when the contact mechanism engages the element, and means adapted to cause the contact mechanism and the stylus point to take up determined initial positions.

3. A device for recording over a distance the variable positions of an element, comprising in combination a sender adapted to ascertain the position of the element and having a contact mechanism co-operating with said element, a receiver instrument having a stylus adapted to travel over a recording surface, driving means adapted to move the contact mechanism and the stylus point periodically, the contact mechanism being operative over the range including the various positions of said element and the stylus point moving over the whole recording range, electric connections between the sender and the receiver, means for synchronizing the start of the movements of the contact mechanism and of the stylus point from their initial positions, means to cause the stylus point to produce a mark on the record surface when the contact mechanism engages the element, and locking means adapted to cause the contact mechanism and the stylus point to take up determined initial positions.

4. A device for recording over a distance the variable positions of an element, comprising in combination a sender adapted to ascertain the position of the element and having a contact mechanism co-operating with said element, a receiver instrument having a stylus point adapted to travel over a recording surface, driving means adapted to move the contact mechanism and the stylus point periodically, the contact mechanism being operative over the range including the various positions of said element and the stylus point moving over the whole recording range, electric connections between the sender and the receiver, means influenced by the receiver instrument for synchronizing the start of the movements of the contact mechanism and of the stylus point from their initial positions, means to cause the stylus point to produce a mark on the record surface when the contact mechanism engages the element, and locking means adapted to cause the contact mechanism and the stylus point to take up determined initial positions.

5. A device for recording over a distance the variable positions of an element, comprising in combination a sender adapted to ascertain the position of the element and having a contact mechanism co-operating with said element, a receiver instrument having a stylus point adapted to travel over a recording surface, an electric synchronous motor operatively connected to the contact mechanism for causing the latter to carry out a rotary movement over the whole range including the various positions of said element, an electric synchronous motor operatively connected to the receiver for causing the stylus point to carry out a linear motion over the whole recording range, electric connections between the sender and the receiver, means for synchronizing the start of the movements of the contact mechanism and of the stylus point from their initial positions, means to cause the stylus point to produce a mark on the record surface when the contact mechanism engages the element, and locking means adapted to cause the contact mechanism and the stylus point to take up determined initial positions.

6. A device for recording over a distance the variable positions of an element, comprising in combination, a sender adapted to ascertain the position of the element and having a contact mechanism co-operating with said element, a receiver instrument having a stylus point adapted to travel over a recording surface, an electric synchronous motor operatively connected through the interposition of a friction gear to the contact mechanism for causing the latter to carry out a rotary movement over the whole range including the various positions of said element, an electric synchronous motor operatively connected to the receiver for causing the stylus point to carry out a linear motion over the whole recording range, electric connections between the sender and the receiver, means for synchronizing the start of the movements of the contact mechanism and of the stylus point from their initial positions, means to cause the stylus point to produce a mark on the record surface when the contact mechanism engages the element, and locking means adapted to cause the contact mechanism and the stylus point to take up determined initial positions.

7. A device for recording over a distance the variable positions of an element, comprising in combination, a sender adapted to ascertain the position of the element and having a contact mechanism co-operating with said element, a receiver instrument having a stylus point adapted to travel over a recording surface, driving means adapted to move the contact mechanism and the stylus point periodically so that the contact mechanism moves over the range including the various positions of said element and the stylus point moves over the whole recording range, electric connections between the sender and the receiver, means influenced by the receiver instrument for synchronizing the start of the movements of the contact mechanism and of the stylus point from their initial positions, means to cause the stylus point to produce a mark on the record surface when the contact mechanism engages the element, locking means adapted to cause the contact mechanism and the stylus point to take up determined initial positions, said means influenced by the receiver instrument for synchronizing the start of the movements of the contact mechanism and of the stylus point rendering said locking means inoperative.

8. A device for recording over a distance the variable positions of indicating means comprising in combinaton, a sender having a contact mechanism provided with a rotatable disc carrying a contact adapted to co-operate with said indicating means, a receiver instrument having a stylus point adapted to travel over a recording surface, an electric synchronous motor operatively connected through the intermediary of a friction gear to said rotatable disc for moving said contact over the whole range over which said indicating means moves, an electric synchronous motor operatively connected to the receiver for causing the stylus point to carry out a linear motion over the whole recording range, electric connections between the sender and the receiver, locking means adapted to cause the contact mechanism and the stylus point to take up determined initial positions, an electro-magnet adapted to release said contact mechanism locking means, and a contact arrangement provided on the receiver and adapted to influence said electro-magnet and to synchronize the start of the movements of the contact mechanism and of the stylus point from their initial positions, and an electro-magnet influenced by the contact between said contact means and said indicating means and causing the stylus point to be pressed towards the record surface for producing a mark.

9. In a recording instrument, a plurality of contact mechanisms, each ascertaining the position of a coordinate element and each comprising a contact mechanism co-operating with its associated element, a receiver having a stylus point adapted to travel over a recording surface, means to move the contact mechanisms and the stylus point periodically and simultaneously, the contact mechanism operative over at least part of the ranges including the various positions of their said elements and the stylus point moving over the whole recording range, means to synchronize the operations of said contacts and stylus, and means to cause the stylus to successively record the engagement of said contact mechanisms and their elements during a movement of the stylus over the recording range.

In testimony whereof I affix my signature.

Dr. ALFRED AMSLER.